US009167389B1

(12) United States Patent
Murchison et al.

(10) Patent No.: US 9,167,389 B1
(45) Date of Patent: Oct. 20, 2015

(54) CLUSTERING LOCATION DATA TO DETERMINE LOCATIONS OF INTEREST (71) Applicant: Blackpoint Holdings, LLC, Ellicott City, MD (US)

(72) Inventors: Jon Murchison, Ellicott City, MD (US); Bryan Johnson, Ellicott City, MD (US)

(73) Assignee: BLACKPOINT HOLDINGS, LLC, Ellicott City, MD (US)

( * ) Notice: Subject to any disclaimer, the term of this patent is extended or adjusted under 35 U.S.C. 154(b) by 0 days.

(21) Appl. No.: 14/598,092

(22) Filed: Jan. 15, 2015

(51) Int. Cl.
*H04W 24/00* (2009.01)
*H04W 4/02* (2009.01)

(52) U.S. Cl.
CPC .............. *H04W 4/028* (2013.01); *H04W 4/027* (2013.01)

(58) Field of Classification Search
CPC ....... H04W 4/02; H04W 64/00; H04W 4/023; H04W 4/021; H04W 4/025; H04W 4/028; H04W 4/04; H04W 4/027
USPC .............. 455/404.2, 456.1, 456.2, 456.3, 457
See application file for complete search history.

(56) References Cited

U.S. PATENT DOCUMENTS

| 6,452,498 | B2  |   | 9/2002  | Stewart        |           |
|-----------|-----|---|---------|----------------|-----------|
| 6,522,790 | B1  | * | 2/2003  | Zhang et al.   | 382/284   |
| 6,628,171 | B1  | * | 9/2003  | Chou et al.    | 331/1 A   |
| 7,920,849 | B2  |   | 4/2011  | Pop            |           |
| 8,090,648 | B2  |   | 1/2012  | Zoldi et al.   |           |
| 8,099,109 | B2  |   | 1/2012  | Altman et al.  |           |
| 8,165,607 | B2  | * | 4/2012  | Lin et al.     | 455/456.6 |
| 8,508,349 | B2  |   | 8/2013  | Morgan et al.  |           |
| 8,666,841 | B1  |   | 3/2014  | Claridge et al.|           |
| 8,700,060 | B2  |   | 4/2014  | Huang          |           |
| 8,825,383 | B1  |   | 9/2014  | Kirmse et al.  |           |
| 2005/0033653 | A1 |  | 2/2005  | Eisenberg et al. |        |
| 2011/0099046 | A1 | * | 4/2011 | Weiss et al.   | 705/7.31  |
| 2012/0284769 | A1 |  | 11/2012 | Dixon et al.   |           |
| 2012/0315877 | A1 | * | 12/2012 | Lewis         | 455/411   |
| 2013/0060582 | A1 | * | 3/2013 | Cutino et al.  | 705/4     |

(Continued)

FOREIGN PATENT DOCUMENTS

| CA | 2836250 A1    | 6/2014 |
| WO | WO 01/58098 A2 | 8/2001 |

(Continued)

OTHER PUBLICATIONS

Reclus et al., "Geofencing for Fleet & Freight Management," IEEE, 2009 9[9] International Conference on Intelligent Transport System Telecommunications (ITST), Oct. 20-22, 2009, pp. 353-356.

*Primary Examiner* — Magdi Elhag
(74) *Attorney, Agent, or Firm* — Sterne, Kessler, Goldstein & Fox P.L.L.C.

(57) ABSTRACT

Systems and methods are disclosed for determining locations visited by a mobile device. In an embodiment, a first location point is identified from a plurality of location points associated with the mobile device. The first location point may be combined with one or more of the plurality of location points to construct a time block. A time block may indicate a continuous period of time when the mobile device is in the same location. An aggregate location is calculated for the time block based on the plurality of points in the time block. One or more time blocks may be grouped based on the aggregate location of each time block, and a spatial clustering procedure is applied to transform the aggregate locations of time blocks in the group into one or more locations of interest.

24 Claims, 6 Drawing Sheets

(56) References Cited

U.S. PATENT DOCUMENTS

| | | |
|---|---|---|
| 2013/0079036 A1 | 3/2013 | Sharet |
| 2013/0145302 A1 | 6/2013 | Young |
| 2013/0226655 A1* | 8/2013 | Shaw .................... 705/7.29 |
| 2013/0268439 A1 | 10/2013 | Lowe |
| 2014/0004881 A1 | 1/2014 | Alles et al. |
| 2014/0087752 A1 | 3/2014 | Zhu et al. |
| 2014/0121958 A1 | 5/2014 | Schenken et al. |
| 2014/0155094 A1 | 6/2014 | Zises |
| 2014/0213287 A1 | 7/2014 | MacDonald et al. |
| 2014/0215469 A1* | 7/2014 | Martikainen ............. 718/100 |
| 2014/0274126 A1* | 9/2014 | Sendonaris ............. 455/456.1 |
| 2014/0274152 A1* | 9/2014 | Lichti .................... 455/456.3 |
| 2014/0278077 A1 | 9/2014 | Levin et al. |
| 2014/0279297 A1 | 9/2014 | Morgan et al. |
| 2015/0031389 A1* | 1/2015 | Liu et al. ................. 455/456.1 |

FOREIGN PATENT DOCUMENTS

| | | |
|---|---|---|
| WO | WO 2009/085045 A1 | 7/2009 |
| WO | WO 2013/131077 | 9/2013 |
| WO | WO 2014/092796 A1 | 6/2014 |
| WO | WO 2014/113882 A1 | 7/2014 |

* cited by examiner

CLUSTERING LOCATION DATA TO DETERMINE LOCATIONS OF INTEREST

BACKGROUND

1. Field

This field is generally related to mobile device tracking.

2. Background

Mobile devices typically track a user's location through location data derived from various data sources, such as global positioning system (GPS), cellular, Wi-Fi, and Bluetooth connections. Location data may include a number of location points that provide a user's geolocation at a particular point in time.

A mobile device may record thousands of location points each day. Several points may refer to the same location, but provide different geographic coordinates due to inaccuracies of location data or subtle movements of a mobile device. As such, a single visited location may appear as multiple locations in the location history due to slightly different coordinates of each location point. Additionally, chronologically consecutive location points may not be recorded as a single visit to a location due to varying coordinates of each point. User assistance is often required to correct these issues in order to provide useful service.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example Location Points

Figure 1:
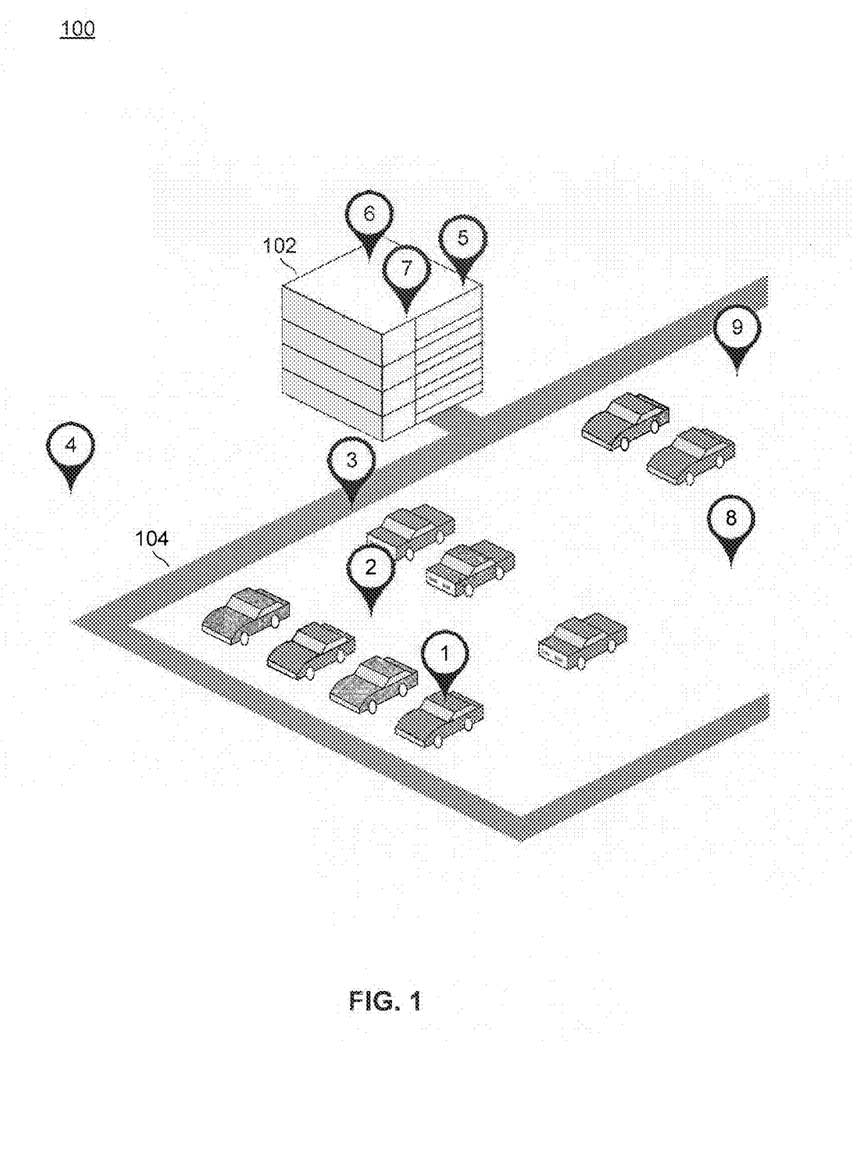
FIG. 1 is a diagram illustrating example location points recorded by a mobile device, according to an embodiment.

FIG. 1 is a diagram illustrating example location points recorded by a mobile device, according to an embodiment. Diagram 100 includes an office building 102, a parking lot 104, and a plurality of location points 1-9 recorded by a mobile device. Location points 1-9 may be derived from various location sources in communication with the mobile device, including, but not limited to, global positioning systems (GPS), cellular towers, Wi-Fi access points, Bluetooth connections, or any combination thereof.

Each of location points 1-9 may be recorded at a different point in time and may provide different geographic coordinates. The differences in geolocation may be due to movement of the mobile device or inaccuracies associated with the location data. For example, an individual may park in parking lot 104 and proceed to office building 102. Location points 1, 2, and 3 may be derived from GPS data and may represent a path taken from parking lot 104 to office building 102. Location point 4 may be derived from the location of a Wi-Fi access point located in an adjacent building. Location point 5 may be derived from the location of a Wi-Fi access point located in office building 102, for instance, when GPS data is unavailable due to obstructions. Location points 6 and 7 may be derived from GPS signals received from unobstructed locations within building 102. Finally, location points 8 and 9 may be location estimates based on signal strength from a nearby cellular tower.

A location of interest for a user may be determined by the frequency that a location is visited and the duration of time spent at that location. For example, an individual may work in office building 102. To develop a pattern of life, it is useful to know when and how often the individual is at work.

Location points 1-9 may be consecutively recorded during the same visit to office building 102. Logically, location points 1-9 refer to the same location and denote a period of time that the individual remained at that location. However, since location points 1-9 provide different geographic coordinates, each location point may be treated as a separate location, providing little useful information to location-based services and systems.

Accordingly, in an embodiment, time blocks of location points are constructed, indicating periods of time that a mobile device is in the same location. A time block may include chronologically consecutive location points recorded by a mobile device and represents a single visit to a particular location. Location points may be compared based on various factors, including, but not limited to, relative distance, speed, and accuracy of location points, to determine whether the two points refer to the same location. Frequently visited locations may be determined based on the number of time blocks that refer to a single location.

Example Time Block

Figure 2:
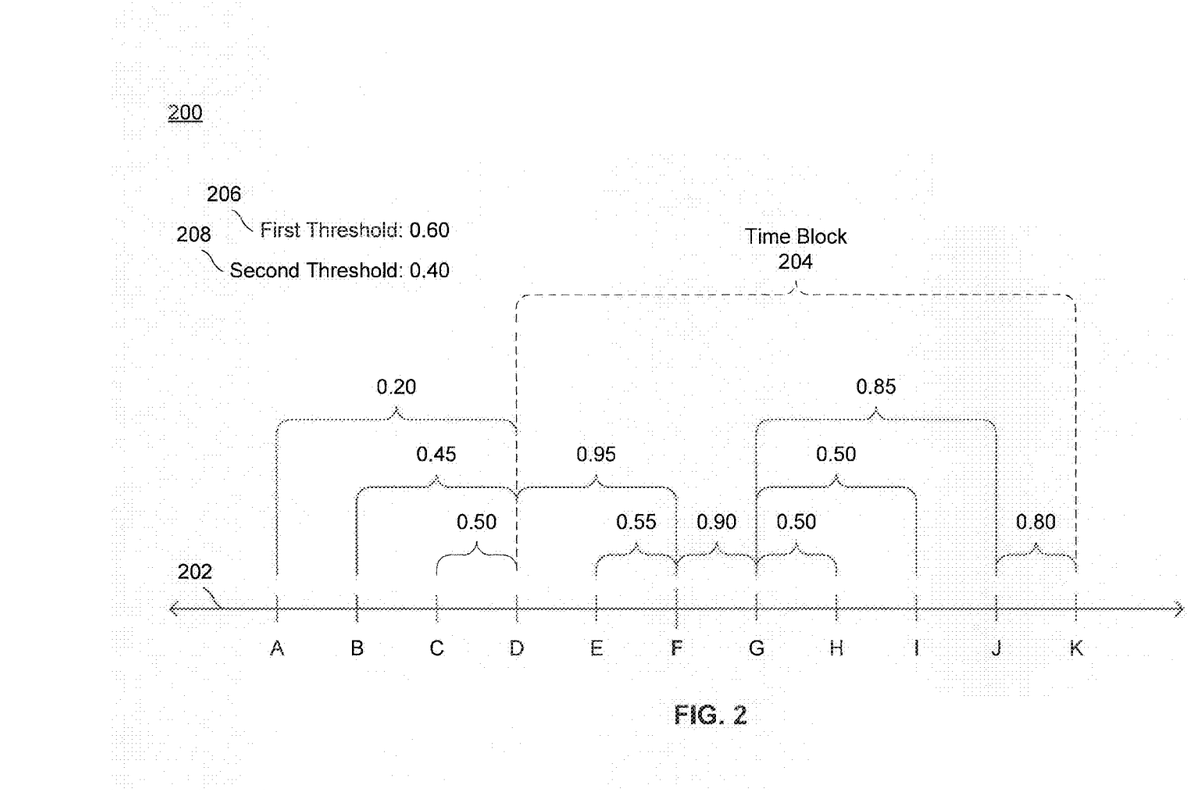
FIG. 2 is a diagram illustrating an example time block, according to an embodiment.

FIG. 2 a diagram illustrating an example time block, according to an embodiment. Timeline 202 includes location points A-K. Location points A-K may be consecutively recorded by a mobile device. Time block 204 is constructed to include location points D-K and indicates a period of time that the mobile device is in a single location.

When constructing time block 204, a first location point may be initially identified from the plurality of location points A-K recorded by the mobile device. For example, location point F may be identified as the first location point. The identified location point may be selected such that the speed of the location point is below a predefined speed threshold and the horizontal accuracy is above a predefined accuracy threshold, according to an embodiment. The thresholds may be set in order to establish a high likelihood that the identified first location point indicates a point in time when the mobile device is stationary or moving very slowly. For example, a speed threshold of 1.3 meters per second paired with a high accuracy threshold suggests that the mobile device is moving no faster than a walking pace.

The identified first location point, e.g., location point F, may then be combined with one or more of the plurality of location points A-K recorded by the mobile device to construct time block 204. In an embodiment, the location points in a time block form a chronologically consecutive string of location points that encompasses the first location point. In this manner, a time block may include location points recorded both before and after the first location point.

In an embodiment, a current location point is set to the identified first location point, for example location point F. The plurality of location points A-K are then iterated in chronological order from location point F, based on a timestamp of each location point, until a second location point is identified. In an embodiment, location points A-K may be iterated either chronologically forward or backward in time from location point F, or both forward and backward, allowing time block 204 to include location points recorded both before and after location point F.

To identify the second location point, a score may be calculated based on the current location point and the second location point. In an embodiment, the second location point is determined when the calculated score is above a first threshold or below a second threshold, for example thresholds 206 and 208, respectively. The first and second thresholds may be defined such that the first threshold is higher than the second threshold.

For example, when iterating forward in time, the calculated score based on location point F and location point G is 0.90. Since this value is above first threshold 206, location point G may be identified as the second location point. A score above the first threshold may indicate a high likelihood that the current location point, location point F, and the second location point, location point G, refer to the same location. Thus, location point G is added to time block 204. Additionally, since the second location point still refers to the same location as the current location point, time block 204 may still be extended to include additional location points. In this manner, the current location point may be set to the second location point, location point G, and the process is repeated to search for a new second location point.

Location point G is then compared to location point H to calculate a score of 0.50. A score below first threshold 206, but above second threshold 208, may indicate that it cannot be determined from the score whether two location points refer to the same location. As such, further analysis may be performed to determine whether the two location points refer to the same location. This may occur, for example, if the mobile device strays a short distance away from the current location point or the location data is inaccurate because of obstructions, etc. In this case, the current location point remains the same, and location point G is compared to the next iterated location point, location point I. Once again, the calculated score of 0.50 based on location points G and I may indicate that further analysis may be performed. Location point G is then compared to location point J. The calculated score of 0.85 is above first threshold 206, indicating that location points G and J likely refer to the same location. As such, location point J may be identified as the second location point, and point J and each iterated location point between location points G and J may added to time block 204. Location point K may similarly be added to time block 204, as the calculated score of 0.80 based on location points J and K is above first threshold 206. In an embodiment, if more location points are recorded beyond location point K, the process may be repeated, iterating until the calculated score based on the current location point and the second location point is below a defined second threshold, for example second threshold 208.

In an embodiment, time block 204 may also be constructed by iterating chronologically backward in time from the identified first location point. Since the calculated score based on location points F and E falls between thresholds 206 and 208, and the calculated score based on location points F and D is above first threshold 206, location points D and E may both be added to time block 204. Iteration may then continue by setting the current location point to location point D. As described above, the second location point may be determined when a calculated score based on the current location point and the second location point is above a first threshold or below a second threshold, for example thresholds 206 and 208, respectively. Thus, location point A may be identified as the second location point, as the score based on location points D and A is below second threshold 208.

A score below the second threshold may indicate that the current location point and the second location point do not refer to the same location. In this case, the time block may cut off at the current location point, without including any iterated location points between the current location point and the second location point. For example, since the calculated score based on location points D and A is below second threshold 208, location points A, B, and C may not be included in time block 204. Hence, time block 204 spans from location point D to location point K.

Scores may be calculated based on various factors. In an embodiment, a score based on a first and second location point is a numerical value calculated based on the speed of the second location point, a computed distance between the two location points, and the horizontal accuracy of the second location point. These values may be converted into an individual speed score, distance score, and accuracy score. For example, a slower speed for the second location point may translate to a higher speed score. In an embodiment, the individual scores may each be assigned a predefined weight. The individual scores may then be transformed into a single score based on the predefined weights assigned to each individual score. A weighted average of the individual scores may then be used to transform the individual scores into a single score.

Example System

Figure 3:
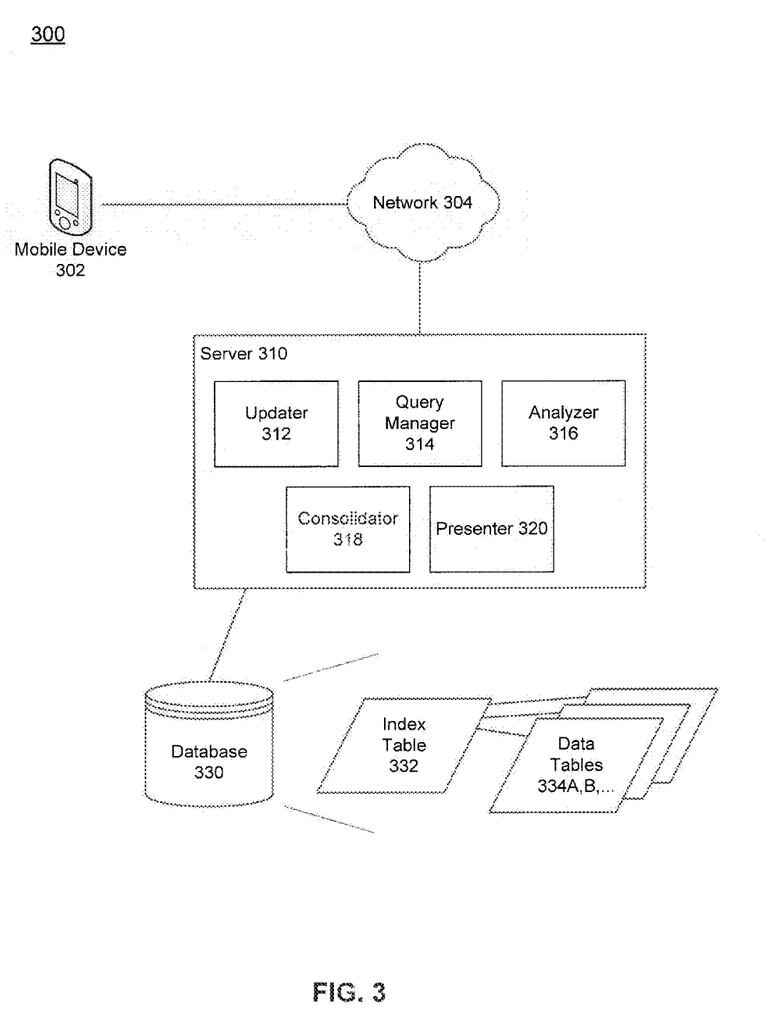
FIG. 3 is an example system for determining locations visited by a mobile device, according to an embodiment.

FIG. 3 depicts an example system 300 for determining locations visited by a mobile device, according to an embodiment. System 300 includes a mobile device 302 coupled to a server 310 via a network 304. Mobile device 302 may be any type of device capable of having its geographical location determined, including, but not limited to, a laptop, desktop, mobile phone, personal digital assistant (PDA), set-top box, embedded device, etc. Network 304 may be any type of computer network capable of communicating data, for example, a local area network, a wide-area network (e.g., the Internet), or any combination thereof. Server 310 may be any type of computing device, including, but not limited to, a desktop, a server, mobile device, appliance, embedded devices, etc. Server 310 includes an updater 312, a query manager 314, an analyzer 316, a consolidator 318, and a presenter 320. Server 310 is also coupled to a database 330.

Mobile device 302 may track its location using various available location data. This data may be derived from various location sources, such as but not limited to GPS, cellular towers, Wi-Fi access points, and Bluetooth connections, or any combination thereof. In an embodiment, location points recorded by the mobile device may be periodically sent to server 310 via network 304. In an embodiment, each location point may include a longitude, latitude, speed, horizontal accuracy, timestamp, or any combination thereof indicating the time that the location point was recorded by the mobile device.

In an embodiment, recorded location points may be streamed individually to server 310 as they are determined at mobile device 302. Recorded location points may be sent to server 310 at a configurable time period, such as, for example, every hour, according to an embodiment. The transmission of recorded location points to server 310 may also be initiated manually. For example, server 310 may send a message to mobile device 302 requesting the recorded location points. In an embodiment, the transmission of recorded location points to server 310 may also be restricted and/or initiated based on defined parameters. For example, mobile device 302 may be configured to restrict the transmission of recorded location points when outside of Wi-Fi coverage and automatically initiate the transmission when a Wi-Fi connection is established. Mobile device 302 may also be configured to send the recorded location points to server 310 when mobile device 302 enters a geographical area, such as when a mobile device 302 enters its user's home or other point-of-interest.

In an embodiment, updater 312 is configured to receive location points sent by mobile device 302. Updater 312 may then write the received location points to database 330. Database 330 stores a plurality of location points and each location point is associated with a mobile device. Database 330 may be any type of structured data store, including a relational or document-oriented database, such as an SQL database.

Database 330 may store data in a plurality of different data tables 334A, B, etc. To improve performance of database queries and updates, database 330 may also include an index table 332. In an embodiment, updater 312 queries index table 332 to assist with data insertions and updates, and query manager 314 queries index table 332 to assist with data retrieval. In an embodiment, the index table may point to entries in data tables 334, which include the complete individual location points. Or, in an embodiment where the database is de-normalized, the index table may itself include the individual location points in part or in full. In this way, index table 332 may be used to improve performance of database queries and updates.

The plurality of location points stored in database 330 may be used to determine locations frequently visited by a mobile device and the time of each visit. This, in turn, may be used to develop a pattern of life for a user, identifying locations of interest and assigning meaningful labels and tags to each. For example, it may be determined that a particular location of interest is visited from 9:00 am to 5:00 pm on most weekdays. Accordingly, this location of interest may be assigned a label of "work," either through automatic analysis or manually by a user. The developed pattern of life may be used to provide personalized services and enhanced security to a user by helping to construct a model of future behavior. In an embodiment, deviations from expected behavior may generate an alert to users or other appropriate parties.

Query manager 314 may retrieve a plurality of location points associated with a mobile device, such as mobile device 302, from database 330. Analyzer 316 may be configured to send a query to query manager 314 for the location points associated with a mobile device, and then construct a time block from the retrieved location points. A time block may indicate a period of time that the mobile device is in the same location.

In an embodiment, analyzer 316 may initially identify a first location point from the plurality of retrieved location points, for example as described with respect to FIG. 2. The identified location point may be selected such that the speed of the location point is below a predefined speed threshold and the horizontal accuracy is above a predefined accuracy threshold, according to an embodiment. The thresholds may be set in order to establish a high likelihood that the identified first location point indicates a point in time when the mobile device is stationary or moving very slowly.

Analyzer 216 may then combine the first location point with one or more of the plurality of retrieved location points to construct a time block, for example as described with respect to FIG. 2. In an embodiment, the location points included in the time block form a chronologically consecutive string of location points that encompasses the first location point. In this manner, the time block may include location points recorded both before and after the first location point.

When constructing a time block, it is possible that the new time block may overlap with a previously constructed time block. In such a case, analyzer 316 may merge the two time blocks into a single time block. According to an embodiment, analyzer 316 may also continue to construct the new time block, replacing the previously constructed time block.

Once a time block has been constructed, analyzer 316 may calculate an aggregate location for the time block based on the plurality of location points in the time block. In an embodiment, the aggregate location may be calculated via an average of the longitude and latitude coordinates of each location point in the time block. The aggregate location may also be calculated via a weighted average of the longitude and latitude coordinates of each location point in the time block. The weights assigned to each location point may be determined based on various factors, including but not limited to, speed, horizontal accuracy, computed distance from furthest location point in the time block, computed distance from the closest location point in the time block, or any combination thereof. The aggregate location provides a single location to associate with the time block.

In an embodiment, time blocks and calculated aggregate locations may be stored in database 330. In a further embodiment, location points stored in database 330 may reference the time block that they are part of. Each time block may be associated with a mobile device, such as mobile device 302. Updater 312 may be configured to write time block data to database 330, and query manager 314 may be configured to retrieve time block data from database 330.

Consolidator 318 may group one or more time blocks based on the aggregate location of each time block. In an embodiment, consolidator 318 may select, either automatically or in response to manual input, a particular location and identify time blocks having an aggregate location within a threshold distance of the selected location. The threshold distance may be predefined or set dynamically by consolidator 318. According to an embodiment, consolidator 318 may also select, either automatically or in response to manual input, a particular time block and identify time blocks having an aggregate location within a threshold distance of the aggregate location of the selected time block.

Consolidator 318 may then apply a spatial clustering procedure to transform the aggregate locations of time blocks in the group into one or more locations of interest. The spatial clustering procedure uses one or more spatial clustering algorithms, such as but not limited to, the density-based spatial clustering of applications with noise (DBSCAN) algorithm. For example, the spatial clustering procedure may further group the time blocks into one or more clusters based on the aggregate locations of the time blocks. The procedure may then determine a centroid or average location for each cluster, which may be classified as locations of interest. As previously discussed, the locations of interest may be used to form a pattern of life for a particular user. Further details of spatial clustering algorithms are well known in the art.

In an embodiment, consolidator 318 may apply the spatial clustering procedure to the same time blocks more than once. This may occur, for example, when new data is received in order to refine the determined locations of interest based on the new data. In an embodiment, consolidator 318 may merge multiple existing locations into one location, or split an existing location into multiple locations. According to an embodiment, if multiple locations are merged into a single location, existing label and tag data from the closest of the multiple locations may be assigned to the new location. According to an embodiment, if a single location is split into multiple locations, existing label and tag data from the single location may be assigned to the closest of the new multiple locations, or alternatively to each of the multiple locations.

In an embodiment, presenter 320 is configured to display the determined locations of interest on a map in an interactive user interface. The user interface may be displayed in any mechanism capable of displaying graphics, for example, the user interface may be displayed in a web application inside a client browser or in a native application at a client device. The user interface may enable a user to manage and edit locations of interest associated with a mobile device. For example, a user may be able to label or tag a location of interest, delete a location of interest, and/or merge or split locations of interest. In an embodiment, the user interface may also provide detailed location information, for example, the number of times visited, the average duration of each visit, and the average time of day of each visit. The user interface provided by presenter 320 may also allow filtering of locations by criteria such as visits within a time/date range, total number of visits, and average or total duration of visits.

In an embodiment, presenter 320 may filter determined locations of interest prior to displaying the locations in the user interface. For example, a highway entrance ramp may be determined to be a location of interest due to frequent heavy traffic. In an embodiment, presenter 320 may use available traffic data from third parties to filter this location from the user interface. In the same manner, in an embodiment, updater 312 may use available third party data to automatically tag or label locations of interest, for example as traffic intersections or entrance ramps.

Example Method

Figure 4:
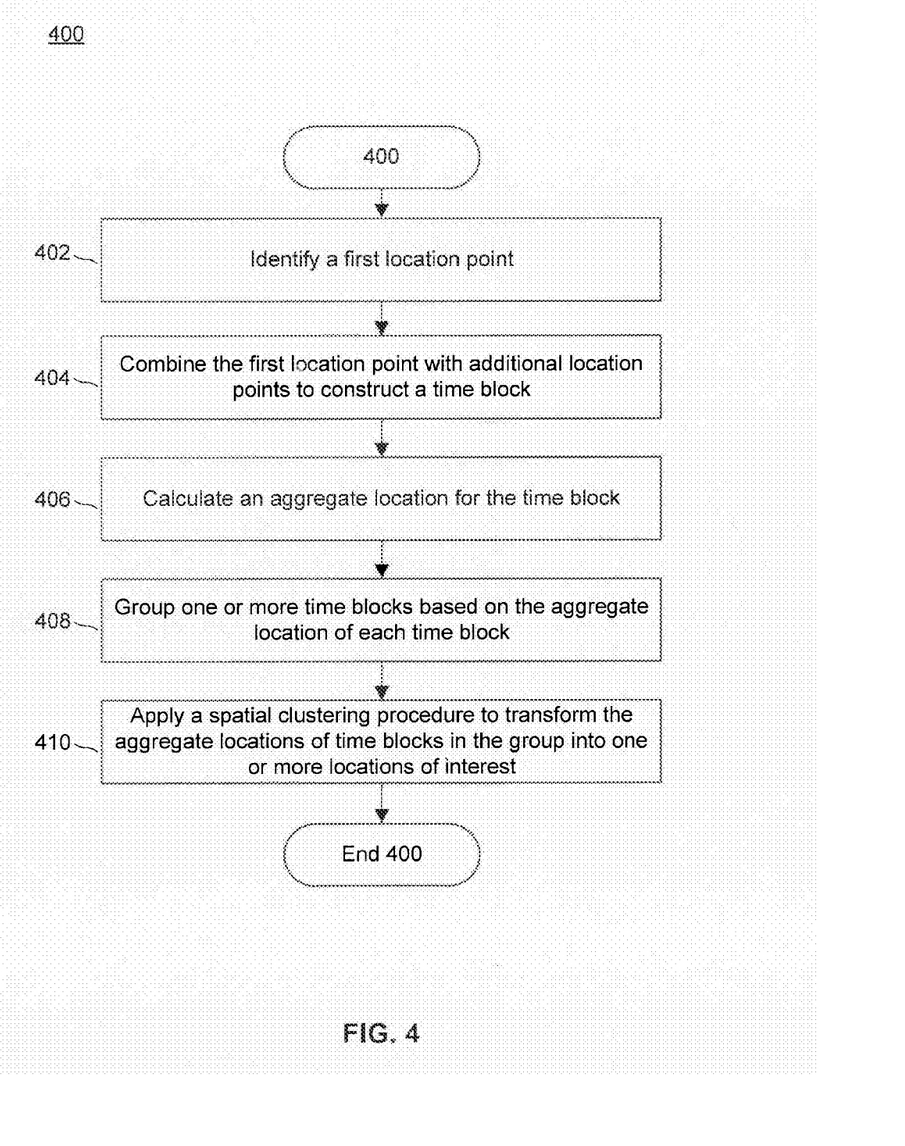
FIG. 4 is an example method for determining locations visited by a mobile device, according to an embodiment.

FIG. 4 is an example method for determining locations visited by a mobile device, according to an embodiment. Method 400 begins at step 402 by identifying a first location point from a plurality of location points associated with the mobile device. The location point may include a longitude, latitude, speed, horizontal accuracy, and/or timestamp. The identified location point may be selected such that the speed of the location point is below a predefined speed threshold and the horizontal accuracy is above a predefined accuracy threshold. The thresholds may be set in order to establish a high likelihood that the identified first location point indicates a point in time when the mobile device is stationary or moving very slowly. For example, a speed threshold of 1.3 meters per second paired with a high accuracy threshold may suggest that the mobile device is moving no faster than a walking pace. In an embodiment, the plurality of location points are stored in a database, such as database 330 of FIG. 3.

At step 404, the first location point may be combined with one or more of the plurality of location points associated with the mobile device, such as by analyzer 316 of FIG. 3. In an embodiment, the location points in the time block form a time-based consecutive string of location points that encompasses the first location point. In this manner, the time block may include location points recorded both before and after the first location point.

At step 406, an aggregate location for the time block may be calculated based on the plurality of location points in the time block, such as by analyzer 316 of FIG. 3. The aggregate location may be calculated via an average of the longitude and latitude coordinates of each location point in the time block. In an embodiment, the aggregate location may be calculated via a weighted average of the longitude and latitude coordinates of each location point in the time block. The weights assigned to each location point may be determined based on various factors, including but not limited to, speed, horizontal accuracy, computed distance from furthest location point in the time block, computed distance from the closest location point in the time block, or any combination thereof. The aggregate location provides a single location to associate with the time block.

At step 408, one or more time blocks may be grouped based on the aggregate location of each time block, such as by consolidator 318 of FIG. 3. In an embodiment, a starting location if first determined. Time blocks within a threshold distance of the starting location are then identified and grouped together.

At step 410, a spatial clustering procedure is applied to transform the aggregate locations of the time blocks in the group into one or more locations of interest. The spatial clustering procedure may further group the time blocks into one or more clusters based on the aggregate locations of the time blocks. The procedure may then determine a centroid or average location for each cluster, which may be classified as locations of interest. Further details of spatial clustering algorithms are well known in the art.

In an embodiment, the one or more locations of interest may be displayed on a map in an interactive interface, such as that provided by presenter 320 of FIG. 3. The user interface may be displayed in any mechanism capable of displaying graphics, for example, the user interface may be displayed in a web application inside a client browser or in a native application at a client device. In an embodiment, the user interface may enable a user to manage and edit locations of interest associated with a mobile device. For example, a user may be able to label or tag a location of interest, delete a location of interest, and/or merge or split locations of interest. In an embodiment, the user interface may also provide detailed location information, for example, the number of times visited, the average duration of each visit, and the average time of day of each visit.

Figure 5:
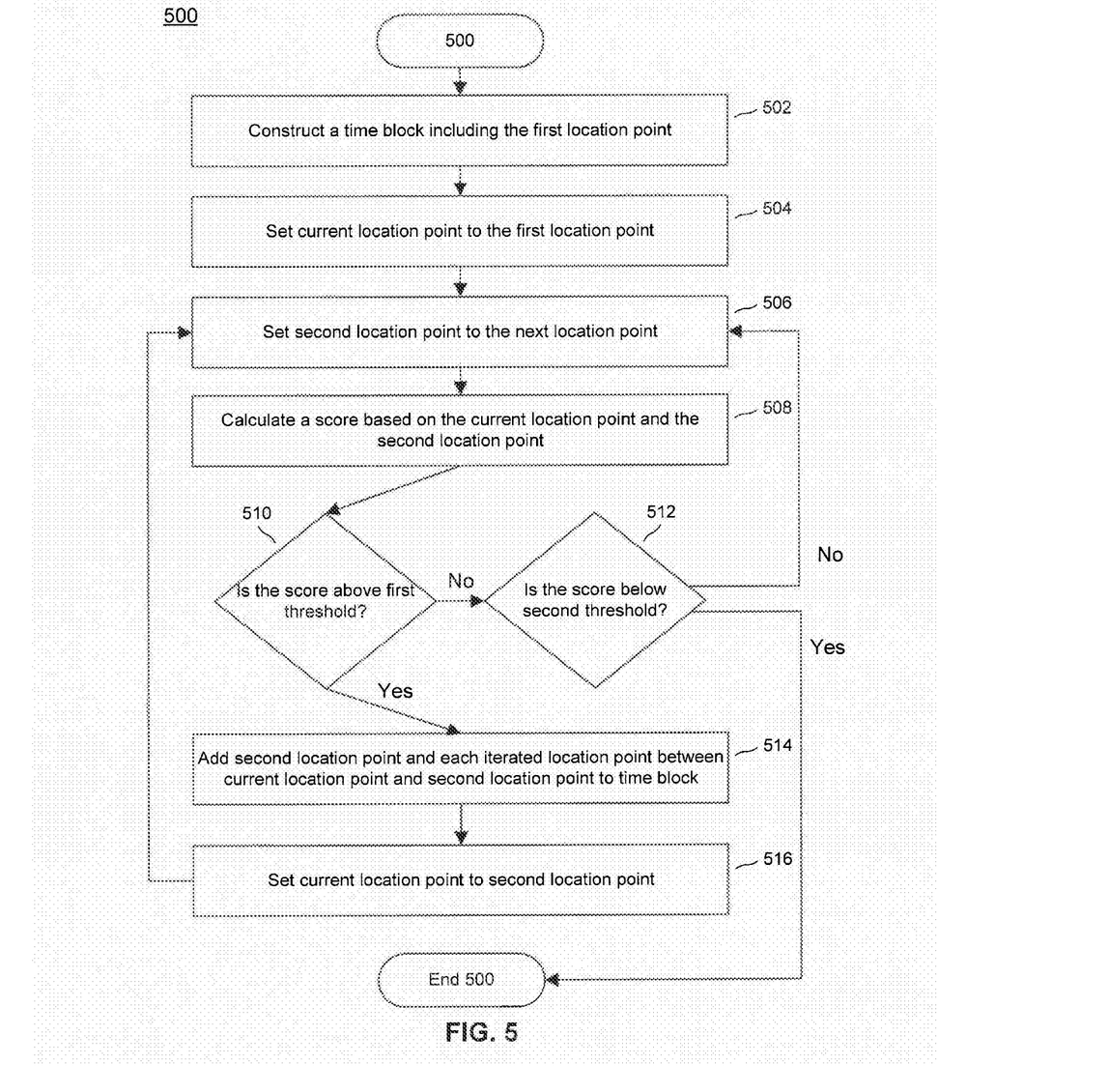
FIG. 5 is an example method for combining a first location point with one or more of a plurality of location points to construct a time block, according to an embodiment.

FIG. 5 is an example method for combining a first location point with one or more of a plurality of location points to construct a time block, according to an embodiment. Method 500 begins at step 502 by constructing a time block including the first location point. At step 504, a current location point is set to the first location point.

At step 506, in an embodiment, a second location point is set to the next location point chronologically either forward and/or backward in time from the first location point. This may allow a time block to be constructed by iterating either chronologically forward or backward, or both forward and backward from a first location point. At step 508, a score may be calculated based on the current location point and the second location point. In an embodiment, the score provides a probability that the current location point and the second location point refer to the same location.

At step 510, it is determined whether the calculated score is above a first threshold. In an embodiment, a score above the first threshold may indicate a high likelihood that the current location point and the second location point refer to the same location. If the calculated score is above the first threshold, the method proceeds to step 514 where the second location point is added to the time block. At step 516, the current location point is set to the second location point. The method then returns to step 506 to repeat the process starting at the new current location point. In this manner, the time block may iteratively extend forward in time, indicating a longer period that the mobile device was in the same location.

Returning to step 510, if it is determined that the calculated score is below the first threshold, the method proceeds to step 512. At step 512, it is determined whether the calculated score is above a second threshold, where the first threshold is higher than the second threshold. In an embodiment, a score below the first threshold but above the second threshold may indicate that it cannot be determined from the score whether two location points refer to the same location. As such, further analysis may be performed to determine whether the two location points refer to the same location. This may occur, for example, if the mobile device strays a short distance away from the current location point.

If the calculated score is above the second threshold, the method returns to step 506. The process then repeats with the current location point unchanged and the second location point set to the next iterated location point. At step 508, a new score is calculated based on the two location points. At step 510, if the calculated score is above the first threshold, the method proceeds to step 514. At step 514, the second location point, as well as each iterated location point between the current location point and the second location point, are added to the time block. This situation may indicate, for example, that the mobile device strayed a short distance from the current location point and before returning.

Returning to step 512, if it is determined that the calculated score is below the second threshold, the method ends without adding any iterated location points between the current location point and the second location point to the time block. In an embodiment, a score below the second threshold may indicate that the current location point and the second location point do not refer to the same location, and thus the second location point should not be included in the same time block.

Example Computer System

Figure 6:
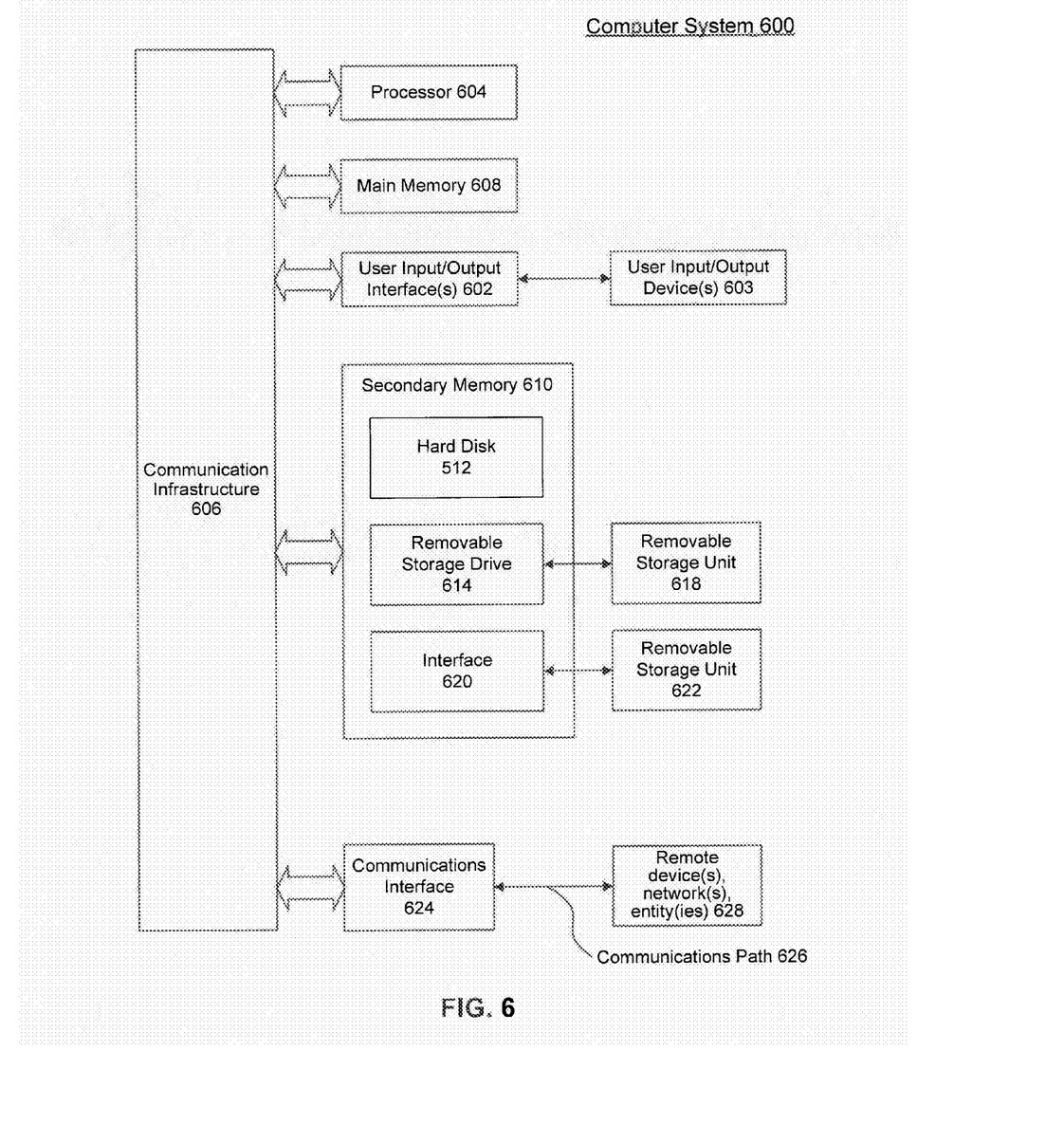
FIG. 6 is a diagram illustrating an example computing device, according to an embodiment.

FIG. 6 is an example computing system useful for implementing various embodiments. Various embodiments can be implemented, for example, using one or more well-known computer systems, such as computer system 600. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 6. In particular, embodiments may operate with software, hardware, and/or operating system implementations other than those described herein.

Conclusion

Identifiers, such as "(a)," "(b)," "(i)," "(ii)," etc., are sometimes used for different elements or steps. These identifiers are used for clarity and do not necessarily designate an order for the elements or steps.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described embodiments, but should be defined only in accordance with the following claims and their equivalents.

What is claimed is:

1. A system for determining locations visited by a mobile device, comprising:
   one or more computing devices;
   a database storing a plurality of location points, wherein each location point is associated with the mobile device;
   an updater, implemented on the one or more computing devices, configured to:
      receive a location point from the mobile device; and
      store the location point in the database;
   a query manager, implemented on the one or more computing devices, configured to:
      receive a query for a plurality of location points associated with the mobile device; and
      retrieve the plurality of location points associated with the mobile device from the database based on the query;
   an analyzer, implemented on the one or more computing devices, configured to:
      send a query to the query manager for the plurality of location points;
      receive the plurality of location points from the query manager;
      identify a first location point from the plurality of location points;
      construct a time block from the first location point and one or more of the plurality of location points, wherein the time block indicates a period of time when the mobile device is in a determined location, and wherein the analyzer is further configured to construct a time block by:
         iterating chronologically through the plurality of location points from the first location point to identify a second location point, wherein the second location point is identified based on a calculated score above a first score threshold or below a second score threshold, and wherein the first score threshold is higher than the second score threshold; and
         including the second location point and each iterated location point between the first and second location points in the time block when the calculated score is above the first score threshold; and
      calculate an aggregate location for the time block based on the plurality of location points in the time block; and
   a consolidator, implemented on the one or more computing devices, configured to apply a spatial clustering procedure to transform the aggregate locations of one or more time blocks into one or more locations of interest.

2. The system of claim 1, further comprising a presenter configured to display the one or more locations of interest on a map in a graphical user interface.

3. The system of claim 1, wherein the analyzer is further configured to:
   receive a location speed and a horizontal location accuracy for the first location point, and wherein the location speed of the first location point is below a speed threshold and the horizontal location accuracy of the first location point is above a location accuracy threshold.

4. The system of claim 1, wherein the analyzer is further configured to construct the time block by:
   iterating chronologically through the plurality of location points from the second location point to identify an additional location point based on a second calculated score, wherein the second calculated score is above the first score threshold or below the second score threshold;
   including the additional location point and each iterated location point between the second location point and the additional location point in the time block when the second calculated score is above the first score threshold; and
   repeating the steps of iterating and including when the second calculated score is above the first score threshold, wherein the plurality of location points are iterated chronologically from the additional location point.

5. The system of claim 1, wherein the iterating comprises iterating through the plurality of location points chronologically forward in time based on a timestamp of each location point.

6. The system of claim 1, wherein the iterating comprises iterating through the plurality of location points chronologically backward in time based on a timestamp of each location point.

7. The system of claim 1, wherein the analyzer is further configured to calculate the calculated score by:
   determining a speed score based on a location speed of the second location point;
   determining a distance score based on a computed distance between the first location point and the second location point;
   determining an accuracy score based on a horizontal location accuracy of the second location point; and
   transforming the speed score, the distance score, and the accuracy score into a single score based on predefined weights assigned to the speed score, the distance score, and the accuracy score.

8. The system of claim 1, wherein the calculated aggregate location is an average of the location points in the time block.

9. The system of claim 1, wherein the consolidator is further configured to group one or more constructed time blocks by:
    determining a starting location;
    identifying time blocks having aggregate locations within a threshold distance of the starting location; and
    grouping together the identified time blocks into a group.

10. The system of claim 1, wherein the plurality of location points comprise locations derived from global positioning system (GPS) data.

11. The system of claim 1, wherein the plurality of location points comprise locations derived from cellular, Wi-Fi, and Bluetooth connections of the mobile device.

12. The system of claim 1, wherein the location of interest is assigned a label and one or more tags.

13. The system of claim 1, wherein:
    the calculated score being above the first score threshold indicates that the second location point should be included in the time block;
    the calculated score being below the second threshold indicates that the second location point should not be included in the time block; and
    the calculated score being between the first score threshold and the second score threshold indicates that it cannot be determined from the calculated score whether the second location point should be included in the time block.

14. A method for determining locations visited by a mobile device, comprising:
    identifying a first location point from a plurality of location points associated with the mobile device;
    constructing a time block from the first location point and one or more of the plurality of location points, wherein the time block indicates a period of time when the mobile device is in a determined location, and wherein constructing the time block further comprises:
        iterating chronologically through the plurality of location points from the first location point to identify a second location point, wherein the second location point is identified based on a calculated score above a first score threshold or below a second score threshold, and wherein the first score threshold is higher than the second score threshold; and
        including the second location point and each iterated location point between the first and second location points in the time block when the calculated score is above the first score threshold;
    calculating an aggregate location for the time block based on the plurality of location points in the time block; and
    applying a spatial clustering procedure to transform the aggregate locations of one or more time blocks into one or more locations of interest.

15. The method of claim 14, further comprising displaying the one or more locations of interest on a map in a graphical user interface.

16. The method of claim 14, further comprising:
    receiving a location speed and a horizontal location accuracy for the first location point, wherein the location speed of the first location point is below a speed threshold and the horizontal location accuracy of the first location point is above a location accuracy threshold.

17. The method of claim 14, wherein the constructing further comprises:
    iterating chronologically through the plurality of location points from the second location point to identify an additional location point based on a second calculated score, wherein the second calculated score is above the first score threshold or below the second score threshold;
    including the additional location point and each iterated location point between the second location point and the additional location point in the time block when the second calculated score is above the first score threshold; and
    repeating the steps of iterating and including when the second calculated score is above the first score threshold, wherein the plurality of location points are iterated chronologically from the additional location point.

18. The method of claim 14, wherein the iterating comprises iterating through the plurality of location points forward in time based on a timestamp of each location point.

19. The method of claim 14, wherein the iterating comprises iterating through the plurality of location points backward in time based on a timestamp of each location point.

20. The method of claim 17, further comprising calculating the calculated score, wherein the calculating comprises:
    determining a speed score based on a speed of the second location point;
    determining a distance score based on a computed distance between the first location point and the second location point;
    determining an accuracy score based on a horizontal location accuracy of the second location point; and
    transforming the speed score, the distance score, and the accuracy score into a single score based on predefined weights assigned to the speed score, the distance score, and the accuracy score.

21. The method of claim 14, wherein the calculated aggregate location is an average of the location points in the time block.

22. The method of claim 14, further comprising grouping the time blocks into a group, wherein the grouping comprises:
    determining a starting location;
    identifying time blocks having aggregate locations within a threshold distance of the starting location; and
    grouping together the identified time blocks into a group.

23. The method of claim 14, wherein:
    the calculated score being above the first score threshold indicates that the second location point should be included in the time block;
    the calculated score being below the second threshold indicates that the second location point should not be included in the time block; and
    the calculated score being between the first score threshold and the second score threshold indicates that it cannot be determined from the calculated score whether the second location point should not be included in the time block.

24. A non-transitory computer-readable storage device having instructions stored thereon that, when executed by at least one computing device, causes the at least one computing device to perform operations comprising:
    identifying a first location point from a plurality of location points associated with a mobile device;
    constructing a time block from the first location point and one or more of the plurality of location points, wherein the time block indicates a period of time when the mobile device is in a determined location, and wherein constructing the time block further comprises:
        iterating chronologically through the plurality of location points from the first location point to identify a second location point, wherein the second location point is identified based on a calculated score above a first score threshold or below a second score threshold, and wherein the first score threshold is higher than the second score threshold; and including the second location point and each iterated location point between the first and second location points in the time block when the calculated score is above the first score threshold;

calculating an aggregate location for the time block based on the plurality of location points in the time block; and applying a spatial clustering procedure to transform the aggregate locations of one or more time blocks into one or more locations of interest.

\* \* \* \* \*